United States Patent [19]

Johnston

[11] 4,433,955
[45] Feb. 28, 1984

[54] TURBINE ARRANGEMENT

[75] Inventor: Richard P. Johnston, Morrow, Ohio

[73] Assignee: General Electric Company, Cincinnati, Ohio

[21] Appl. No.: 247,682

[22] Filed: Mar. 26, 1981

[51] Int. Cl.³ .............................................. F01D 1/04
[52] U.S. Cl. .................................... 415/1; 415/199.5; 416/201 R
[58] Field of Search .................. 415/199.5, 199.6, 181, 415/198.1, 119, 1; 416/201 R

[56] References Cited

U.S. PATENT DOCUMENTS

| 1,962,382 | 6/1934 | Busquet . | |
|---|---|---|---|
| 2,435,236 | 2/1948 | Redding | 415/181 |
| 2,575,682 | 11/1951 | Price | 415/181 X |
| 2,947,466 | 8/1960 | Busquet . | |
| 2,953,295 | 9/1960 | Stalker | 415/181 |
| 2,991,929 | 7/1961 | Stalker | 415/199.5 X |
| 4,011,028 | 3/1977 | Borsuk | 415/199.5 X |
| 4,131,387 | 12/1978 | Kazin et al. | 415/119 |

FOREIGN PATENT DOCUMENTS

| 503596 | 6/1964 | Canada . | |
|---|---|---|---|
| 1035565 | 10/1967 | United Kingdom | 415/119 |
| 1278825 | 6/1972 | United Kingdom | 415/129 |

OTHER PUBLICATIONS

Drawing of Pratt & Whitney JT9D Engine.

Primary Examiner—Philip R. Coe
Attorney, Agent, or Firm—Francis L. Conte; Derek P. Lawrence

[57] ABSTRACT

A turbine arrangement for a gas turbine engine having a sloped gas flowpath through the turbine. The radial axes of the rotor blades and stator vanes in the sloped flowpath are tilted such that the axes are substantially normal to the mean flow streamline of the gases. This arrangement reduces tip losses and thereby increases engine efficiency.

12 Claims, 3 Drawing Figures

TURBINE ARRANGEMENT

BACKGROUND OF THE INVENTION

1. Field of the Invention

This invention relates to turbine arrangements for gas turbine engines, and particularly to a new and improved turbine arrangement wherein the radial axes of the turbine blades and stator vanes are arranged to be substantially normal to the mean flow streamline of the gases flowing through the turbine.

2. Description of the Prior Art

The annular gas flowpath within the turbine section of a gas turbine engine often includes a portion which is sloped outwardly away from the longitudinal axis of the engine. The sloped arrangement permits the turbine rotor blades which are disposed within the flowpath to be at a greater radial distance from the engine longitudinal axis, and thus have a longer moment arm and higher tangential velocities, than would the rotor blades in a nonsloped or reduced-slope flowpath. The longer moment arm allows lower aerodynamic loading thus permitting a more efficient transfer of aerodynamic energy from the gases in the flowpath to the turbine rotor.

However, the rotor blades and stator vanes within the highly sloped portion of the flowpath in prior art turbines remain aligned such that their radial axes are perpendicular to the engine longitudinal axis. Thus, the hot gases flowing through the sloped portion of the turbine flowpath encounter the blades and vanes at an angle other than at the normal. As a result, a spanwise flow of gases toward the radially outer ends of the rotor blades is induced. Such a configuration causes tip losses, that is, some of the gases tend to escape around tips of the rotor blades rather than flowing across the blades in a chordwise direction. This phenomenon is similar to the tip losses which occur off highly sweptback wings on aircraft. Such tip losses in the turbine reduce engine efficiency by reducing the amount of work available to rotate the turbine rotor. To make up for the tip losses, the engine must be operated at higher temperatures to produce more hot gases, with a corresponding increase in fuel consumption and decrease in engine life.

Another problem encountered in prior turbines is that the maximum amount of tip losses due to flowpath slope which are acceptable within a turbine sets a structural limitation to the degree of slope which can be built into the turbine flowpath. For the reasons indicated earlier, however, it may be desirable to have a flowpath with a slope greater than that limitation. Thus, a conflict exists between the desired degree of flowpath slope and the engine efficiency decrease due to tip losses caused by flowpath slope.

In view of the above-mentioned problems, it is therefore an object of the present invention to provide a turbine arrangement for reducing rotor blade tip losses and thereby increasing engine efficiency in turbines having a highly sloped gas flowpath.

Another object of the present invention is to provide a turbine arrangement in which the degree of slope of the gas flowpath can be increased beyond that in current engines without exceeding the limit of maximum acceptable tip losses.

SUMMARY OF THE INVENTION

The present invention comprises a turbine arrangement for a gas turbine engine which decreases rotor blade tip losses and therefore increases engine efficiency. The turbine arrangement includes an annular gas flowpath and a plurality of blade rows and vane rows therein. The blade rows comprise a plurality of circumferentially spaced rotor blades and the vane rows comprise a plurality of circumferentially spaced stator vanes. The flowpath is arranged such that, through at least a forward portion thereof, a mean flow streamline of the hot gases flowing through the flowpath slopes away from the engine longitudinal axis and the flowpath increases to annular height. The radial axes of the rotor blades and stator vanes in that forward portion of the flowpath are tilted forward such that the axes are substantially normal to the mean flow streamline.

The forward portion of the flowpath has a slope greater than a reference flowpath wherein radial axes of reference rotor blades are disposed substantially normal to the longitudinal axis. The forward portion is effective to increase the slope of gases flowing through the flowpath to permit the rotor blades to be disposed at greater radial distances. In this manner, more efficient transfer of energy from the gases to the turbine rotor relative to the reference flowpath is achievable.

In a particular embodiment of the invention, the flowpath is arranged such that at its downstream end, the mean flow streamline is substantially parallel to the engine longitudinal axis.

BRIEF DESCRIPTION OF THE DRAWING

This invention will be better understood from the following description when taken in conjunction with the accompanying drawing, wherein.

DESCRIPTION OF THE PREFERRED EMBODIMENT

Figure 1:
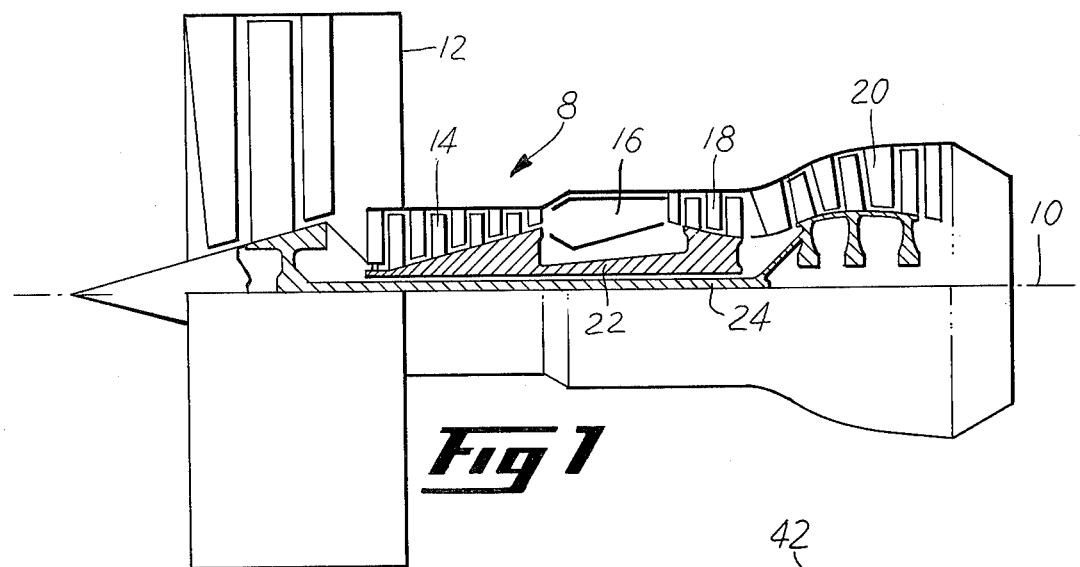
FIG. 1 is a cross-sectional view of a gas turbine engine incorporating the turbine arrangement of the present invention.

Turning now to a consideration of the drawing, and in particular to FIG. 1, there is shown a typical gas turbine engine 8. The engine 8 is arranged substantially concentrically about a longitudinal axis, depicted by the dashed line 10, and includes a fan 12, a compressor 14, a combustor 16, a high pressure turbine 18, and a low pressure turbine 20. Air is compressed in the compressor 14 and then flows into the combustor 16, wherein it is mixed with fuel and ignited. The resulting expanding hot gases flow across the blades of the high pressure turbine 18 and the low pressure turbine 20, causing both turbines to rotate. The high pressure turbine 18 rotates the compressor 14 through a shaft 22. The low pressure turbine 20 rotates the fan 12 and other components through a shaft 24. Although a turbofan engine is shown in FIG. 1, it is to be understood that the invention hereinafter described can be effectively employed on any type of gas turbine engine.

Figure 2:
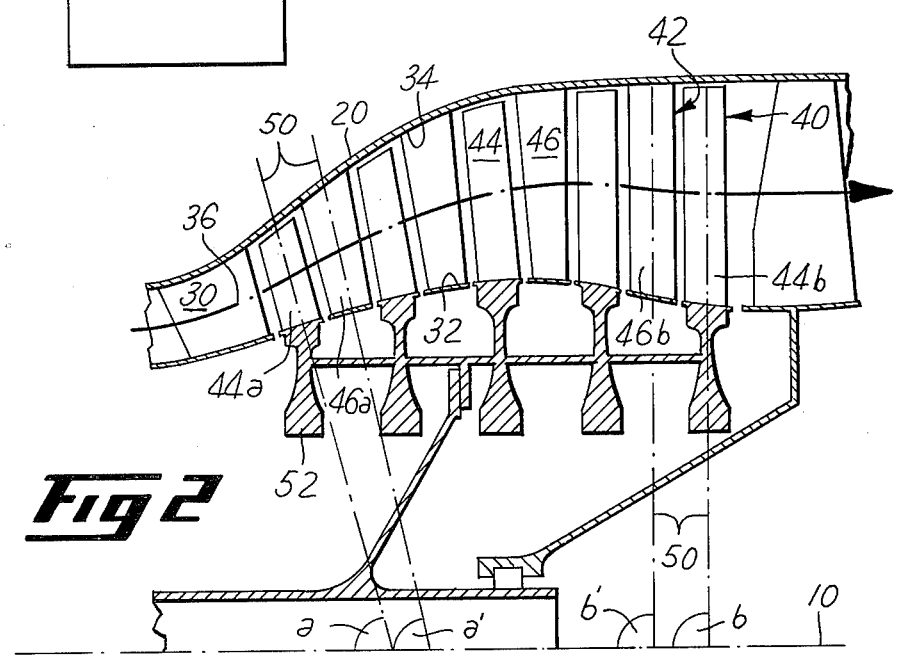
FIG. 2 is a cross-sectional view of the upper half of a turbine arrangement incorporating features of the present invention.

Turning now to FIG. 2, the low pressure turbine section 20 of the engine 8 is shown. The turbine arrangement includes an annular gas flowpath 30 which is defined by radially inner and outer boundaries 32 and 34, respectively. Such boundaries can comprise, for example, shrouds and bands. The hot gases exiting the combustor 16 flow through the flowpath 30, causing the turbine 20 to rotate, and then exit the engine 8 through the downstream end thereof.

The mean flow streamline, depicted by the dashed line 36, is a streamline characterized by a velocity and a direction of flow which is the average velocity and average direction of flow of the particles of the gases at all points along the gas flowpath 30. The gas flowpath 30 is arranged such that in a downstream direction, through at least a forward portion of the gas flowpath, the mean flow streamline 36 slopes away from the engine longitudinal axis 10. This arrangement permits a rapid flaring or high degree of slope of the gas flowpath 30 radially outwardly. This is desirable in that the rotor blades 44 in the forward stages of the turbine are thereby at a greater radial distance from the engine longitudinal axis 10, and thus have a longer moment arm, than would the rotor blades in a nonsloped or reduced-slope flowpath. The longer moment arm allows a more efficient transfer of aerodynamic energy from the gases flowing through the flowpath of the turbine rotor.

Preferably, the gas flowpath 30 is arranged such that at a downstream portion, the mean flow streamline 36 is substantially parallel to the engine longitudinal axis 10. Engine thrust is thereby directed substantially parallel to the engine longitudinal axis 10.

The low pressure turbine 20 comprises at least one and preferably a plurality of blade rows 40 spaced alternately with a plurality of vane rows 42, the blade rows and vane rows being disposed within the flowpath 30. Each blade row 40 comprises a plurality of circumferentially spaced rotor blades 44 attached together in an appropriate manner, such as to a rotor disk, which rotate about the engine longitudinal axis 10. Each vane row 42 comprises a plurality of circumferentially spaced stator vanes 46 which are attached together in an appropriate manner. Each of the vane rows 42 is disposed about the engine longitudinal axis 10 and remains stationary to direct the hot combustor gases to flow across the rotor blades 44 downstream thereof. The rotor blades 44 and the stator vanes 46 preferably extend substantially the entire distance between the radially inner and radially outer boundaries 32 and 34 of the flowpath 30.

The turbine arrangement of the present invention is particularly advantageous over prior turbine arrangements in that it places the rotor blades 44 and the stator vanes 46 substantially normal to the mean flow streamline 36 of the combustor gases flowing through the gas flowpath 30. This arrangement causes the combustor gases to flow chordwise across the surfaces of the rotor blades 44 and reduces the tendancy of the gases to flow spanwise toward the radially outer ends of the rotor blades. Thus, tip losses are reduced and turbine efficiency increases.

More specifically, the rotor blades 44 and stator vanes 46 include radial axes, depicted by the dashed lines 50, which extend spanwise through the radially inner and radially outer ends thereof. The rotor blades 44 and stator vanes 46 are disposed such that their radial axes 50 are substantially normal, or perpendicular, to the mean flow streamline 36. By "substantially normal" it is meant that the radial axes 50 and the mean flow streamline 36 are sufficiently close to being perpendicular to each other and that the desired reduction in tip flow losses is accomplished. To achieve this relationship in the forward portion of the flowpath 30 where the mean flow streamline 36 slopes away from the engine longitudinal axis 10, the radial axes 50 are tilted forward at an angle less than 90° from the engine longitudinal axis 10. As can be seen in FIG. 2, for example, the axes 50 of a rotor blade 44a and a stator vane 46a lie at an angle a and a', respectively, to the engine longitudinal axis 10.

As the mean flow streamline 36 becomes more parallel to the engine longitudinal axis 10, the rotor blades 44 and stator vanes 46 in that portion of the flowpath 30 are also disposed such that their radial axes 50 are substantially normal to the mean flow streamline. Correspondingly, the radial axes 50 in that portion of the flowpath 30 have little or no forward tilt and therefore lie at an angle closer to 90° from the engine longitudinal axis 10. For example, the radial axes of the rotor blade 44b and the stator vane 46b lie at angles b and b', respectively, from the engine longitudinal axis 10. Preferably, the radial axes 50 of the rotor blades 44 and the stator vanes 46 of all of the blade rows 40 and the vane rows 42 of the turbine 20 are arranged to be substantially normal to the mean flow streamline 36. Thus, blades 44b and vanes 46b have radial axes substantially normal to longitudinal axis 10 for directing engine thrust substantially parallel to axis 10. For maximum structural strength, it is preferable that the base portions 52 (which are not disposed in the gas flowpath 30) of all of the rotor blades 44 be aligned such that their radial axes are normal to the engine longitudinal axis 10.

Figure 3:
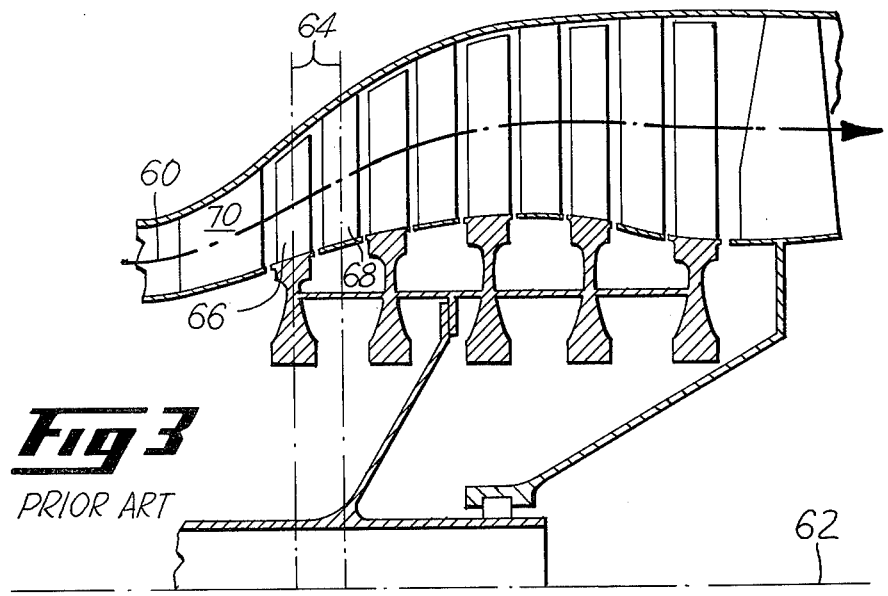
FIG. 3 is a cross-sectional view of the upper half of a prior art turbine arrangement.

Reference is now made to FIG. 3 wherein a typical prior art turbine arrangement is shown. A portion of a reference flowpath defined by the mean flow streamline 60 slopes away from the engine longitudinal axis 62. However, the radial axes 64 of reference rotor blades 66 and the stator vanes 68 are not tilted forward. Rather, they are dispersed substantially normal to longitudinal axis 10. Thus, when the mean flow streamline 60 is sloped, it flows across the rotor blades 66 and stator vanes 68 at an angle. Some of the hot gases would thereby tend to flow spanwise along the length of the rotor blade resulting in undesirable tip losses and a corresponding reduction in engine efficiency. Furthermore, the degree of slope which can be built into the annular gas flowpath 70 is limited by the maximum amount of acceptable tip loss. Thus, there is imposed a structural limitation upon the turbine configuration caused by the nontilted rotor blades 66 and stator vanes 68.

Therefore, the turbine arrangement of the present invention shown in FIG. 2 reduces tip losses in turbine arrangements having highly sloped mean flow streamlines 36. Furthermore, the present invention allows the forward position of the annular gas flowpath 30 to be structurally configured to have a greater slope than would be practical in the reference flowpath of the prior art turbine arrangement shown in FIG. 3. Thus, rotor blades 44 are disposed at greater radial distances for more efficient transfer of energy from the gases to the turbine rotor relative to the reference flowpath.

It is to be understood that this invention is not limited to the particular embodiment disclosed, and it is intended to cover all modifications coming within the true spirit and scope of this invention as claimed.

What is claimed is:

1. In a gas turbine engine arranged substantially concentrically about a longitudinal axis thereof, a turbine arrangement for receiving and being rotated by hot gases exiting a combustor of said engine, said turbine arrangement comprising:

a. an annular gas flowpath disposed about said engine longitudinal axis and defined by radially inner and outer boundaries, said flowpath being arranged such that in a downstream direction through at least a forward portion of said flowpath, a mean flow streamline of said hot gases flowing therethrough slopes away from said engine longitudinal axis and said flowpath increases in annular height; and b. a plurality of blade rows and vane rows spaced alternately and within said flowpath, each of said blade rows and each of said vane rows comprising a plurality of circumferentially spaced rotor blades and stator vanes, respectively, said rotor blades extending radially outwardly from a turbine rotor, the rotor blades and the stator vanes of said blade and vane rows within said forward portion of said flowpath having radial axes tilted forward at an angle less than 90° from said engine longitudinal axis so that said radial axes are substantially normal to said mean flow streamline;

said forward portion of said gas flowpath having a slope greater than that of a reference flowpath wherein radial axes of reference rotor blades are disposed substantially normal to said longitudinal axis, said forward portion of said gas flowpath being effective for increasing the slope of said gases flowing therethrough for permitting said rotor blades to be disposed at greater radial distances for more efficient transfer of energy from said gases to said turbine rotor relative to said reference flowpath.

2. The turbine arrangement of claim 1 wherein a downstream portion of said flowpath is arranged so that said mean flow streamline is substantially parallel to said engine longitudinal axis and at least one of said plurality of blade and vane rows has radial axes disposed substantially normal to said engine longitudinal axis for directing engine thrust substantially parallel to said longitudinal axis.

3. The turbine arrangement of claim 1 wherein said flowpath is arranged so that the angle which said mean flow streamline makes with said engine longitudinal axis decreases from an upstream end to a downstream end of said flowpath.

4. The turbine arrangement of claim 1 wherein the radial axes of said rotor blades and said stator vanes of all of said blade and vane rows of the turbine are arranged to be substantially normal to said mean flow streamline.

5. The turbine arrangement of claim 1 wherein said rotor blades include base portions disposed outside of said flowpath, said base portions having radial axes aligned normal to said engine longitudinal axis.

6. For a gas turbine engine including a combustor effective for generating combustion gases and a turbine effective for receiving said gases for driving a rotor, a method for arranging said turbine comprising the steps of:

arranging an annular gas flowpath in a reference flowpath disposed about a longitudinal axis of said engine and defined by radially inner and outer boundaries, said flowpath being arranged so that in a downstream direction through at least a forward portion of said flowpath a means flow streamline of said combustion gases flowing therethrough slopes away from said engine longitudinal axis and said flowpath increases in annular height;

arranging a plurality of blade rows and vane rows spaced alternately and within said reference flowpath, each of said blade rows and each of said vane rows comprising a plurality of circumferentially spaced rotor blades and stator vanes, respectively, said rotor blades extending radially outwardly from said rotor, the rotor blades and the stator vanes of said blade and vane rows within said forward portion of said flowpath having radial axes disposed at about 90° from said engine longitudinal axis;

said reference flowpath and said blade and vane rows being arranged so that aerodynamic losses of said gases flowing over radially outer tip portions of said rotor blades are at acceptable standards;

arranging said rotor blades and said stator vanes within said forward portion of said flowpath so that said radial axes are tilted forward at an angle less than 90° from said engine longitudinal axis; and arranging said annular gas flowpath so that said mean flow streamline of said forward portion of said flowpath slopes at angles greater than those in said reference arrangement thereof.

7. A method for arranging a turbine according to claim 6 further including:

arranging said plurality of blade rows and vane rows so that said blade and vane rows within said forward portion of said flowpath are disposed at radii greater than those of said blades and vanes in said reference flowpath for increasing tangential velocities and moment arms of said rotor blades for increasing efficiency of transfer of energy from said gases to said rotor.

8. A method for arranging a turbine according to claim 6 wherein said rotor blades and stator vanes within said forward portion of said flowpath are arranged so that said radial axes are substantially normal to said mean flow streamline.

9. In a method of arranging a gas turbine engine of the type including a combustor effective for generating combustion gases and a turbine effective for receiving said gases for driving a rotor, said turbine including an annular gas flowpath having a forward portion wherein a mean flow streamline slopes away from an engine longitudinal axis in a downstream direction and a plurality of blade rows and vane rows spaced alternately and within said flowpath, said blade rows extending radially outwardly from said rotor, the steps of:

arranging said blade rows and said vane rows within said forward portion of said flowpath for having radial axes tilted forward at an angle less than 90° from said engine longitudinal axis; and arranging said annular gas flowpath so that said mean flow streamline of said forward portion of said flowpath has an increased slope for increasing efficiency of transfer of energy from said gases to said rotor.

10. In a gas turbine engine including a combustor effective for generating combustion gases and a turbine effective for receiving said gases for driving a rotor, said turbine including an annular gas flowpath having a forward portion wherein a mean flow streamline slopes away from an engine longitudinal axis in a downstream direction and a plurality of blade rows and vane rows spaced alternately and within said flowpath, said blade rows extending radially outwardly from said rotor, an improved turbine comprising:

said blade rows within said forward portion of said flowpath having radial axes tilted forward at an angle less than 90° from said engine longitudinal axis; and said forward portion of said flowpath being arranged so that said mean flow streamline of said gases has an increased slope.

11. An improved turbine arrangement according to claim 10 wherein said rotor blades are disposed at incrased radii for increasing tangential velocity and moment arm of said rotor blades for increasing efficiency of transfer of energy from said gases to said rotor.

12. An improved turbine arrangement according to claim 10 wherein said blade rows within said forward portion of said flowpath are arranged such that said radial axes are substantially normal to said mean flow streamline.

* * * * *

Disclaimer

4,433,955.—*Richard P. Johnston*, Morrow, Ohio. TURBINE ARRANGEMENT. Patent dated Feb. 28, 1984. Disclaimer filed Apr. 26, 1984, by the assignee, *General Electric Co.*

Hereby enters this disclaimer to claims 6, 7, 8 and 9 of said patent.
[*Official Gazette June 19, 1984.*]